United States Patent [19]
Agazzi et al.

[11] Patent Number: 5,606,464
[45] Date of Patent: Feb. 25, 1997

[54] CANCELLATION OF PRECURSOR INTERSYMBOL INTERFERENCE IN MAGNETIC RECORDING CHANNELS

[75] Inventors: Oscar E. Agazzi, Florham Park; Nambirajan Seshadri, Chatham, both of N.J.

[73] Assignee: Lucent Technologies Inc., Murray Hill, N.J.

[21] Appl. No.: 381,630

[22] Filed: Jan. 31, 1995

[51] Int. Cl.$^6$ ............................... G11B 5/09; G11B 5/035
[52] U.S. Cl. ................................................ 360/46; 360/65
[58] Field of Search ......................... 360/46, 65; 375/348

[56] References Cited

U.S. PATENT DOCUMENTS

| 4,195,318 | 3/1980 | Price et al. | 360/39 |
|---|---|---|---|
| 5,088,111 | 2/1992 | McNamara et al. | 375/18 |

OTHER PUBLICATIONS

A. Gersho, T. L. Lim, "Adaptive Cancellation of Intersymbol Interference for Data Transmission", *Bell System Technical Journal*, vol. 60, No. 11, Nov. 1981, pp. 1997–2021.

E. Biglieri, A. Gersho, R. D. Gitlin, T. L. Lim, "Adaptive Cancellation of Nonlinear Intersymbol Interference for Voiceband Data Transmission", *IEEE Journal of Selected Areas in Communications*, vol. SAC-2, No. 5, Sep. 1984, pp. 765–777.

S. Serfaty, J. L. LoCicero, G. E. Atkin, "Cancellation of Nonlinearities in Bandpass QAM Systems", *IEEE Transactions on Communications*, vol. 38, No. 10, Oct. 1990, pp. 1835–1843.

S. Serfaty, "Performance of Combined Trellis Coded Modulation and Nonlinear Cancellation", *IEEE Transactions on Communications*, vol. 41, No. 1, Jan. 1993, pp. 7–10.

K. Wesolowski, "On the Performance and Convergence of the Adaptive Canceller of Intersymbol Interference in Data Transmission", *IEEE Transactions on Communications*, vol. COM-33, No. 5, May 1985, pp. 425–432.

E. R. Kretzmer, "Generalization of a Technique for Binary Data Communication,", *IEEE Transactions on Communications*, vol. COM-14, pp. 67–68, Feb. 1966.

A. Lender, "Correlative Level Coding for Binary Data Transmission", *IEEE Spectrum*, vol. 3, pp. 106–115, Feb. 1966.

P. Kabal and S. Pasupathy, "Partial–response Signaling", *IEEE Transactions on Communications*, vol. COM-23, No. 9, pp. 921–934, Sep. 1975.

(List continued on next page.)

*Primary Examiner*—W. C. Kim
*Attorney, Agent, or Firm*—Kenneth M. Brown

[57] ABSTRACT

A method and apparatus for the processing of magnetic recording data signals which provides for the cancellation of the effects of precursor intersymbol interference (ISI) in the data signals. According to one illustrative embodiment, an adaptive filter is used to produce a replica of the precursor ISI, which is then subtracted from a delayed version of the data signal. The amount of the delay is advantageously equal to the delay between the main peak of the channel impulse response and the leading undershoot (i.e., the precursor ISI effect) which is to be canceled. The signal which is provided to the adaptive filter (to produce the precursor ISI replica) may be based on tentative decisions generated by a symbol-by-symbol detector, and may first be converted from three levels to two levels by a three-to-two level converter. The resultant signal (after the aforementioned subtraction), which is essentially precursor ISI-free, may then be processed by a conventional Viterbi decoder to produce the decoded symbol data.

14 Claims, 3 Drawing Sheets

OTHER PUBLICATIONS

A Viterbi, "Error Bounds for Convolutional Codes and an Asymptotically Optimum Decoding Algorithm", *IEEE Transactions on Information Theory*, vol. IT–13, pp. 260–269, Apr. 1967.

O. Agazzi. D. G. Messerschmitt, D. A. Hodges, "Nonlinear Echo Cancellation of Data Signals", *IEEE Transactions on Communications*, vol. COM–30, No. 11, Nov. 1982.

G. D. Forney, Jr., "The Viterbi Algorithm", *Proceedings of the IEEE*, vol. 61, No. 3, pp. 268–278, Mar. 1973.

J. M. Cioffi, W. L. Abbott, H. K. Thapar, C. M. Melas, K. D. Fisher, "Adaptive Equalization in magnetic–Disk Storage Channels," *IEEE Communications Magazine*, Feb. 1990, pp. 14–29.

P. H. Siegel, J. K. Wolf, "Modulation and Coding for Information Storage", *IEEE Communications Magazine*, Dec. 1991, pp. 68–86.

R. W. Wood, "Magnetic Recording Systems," *Proceedings of the IEEE*, vol. 74, No. 11, Nov. 1986, pp. 1557–1569.

H. Kobayashi, D. T. Tang, "Application of Partial–Response Channel Coding to Magnetic Recording Systems", *IBM J. Res. Development*, pp. 368–375, Jul. 1970.

G. D. Forney, Jr., "Maximum–Likelihood Sequence Estimation of Digital Sequences in the Presence of Intersymbol Interference", *IEEE Transactions on Information Theory*, vol. IT–18, No. 3, May 1982, pp. 363–378.

R. D. Cideciyan, F. Dolivo, R. Hermann, W. Hirt, W. Schott, "A PRML System for Digital Magnetic Recording", *IEEE Journal on Selected Areas in Communications*, vol. 10, No. 1, Jan. 1992.

R. Hermann, "Volterra Modeling of Digital Magnetic Saturation Recording Channels", *IEEE Transactions on Magnetics*, vol. 26, No. 5, Sep. 1990, pp. 2125–2127.

J. Sonntag, et al. "A High Speed, Low Power PRML Read Channel", *Digests of the Magnetic Recording Conference*, San Diego, Aug. 15–17, 1994.

CANCELLATION OF PRECURSOR INTERSYMBOL INTERFERENCE IN MAGNETIC RECORDING CHANNELS

FIELD OF THE INVENTION

The present invention relates generally to the field of magnetic recording in computer disk drive systems and more particularly to the cancellation of precursor intersymbol interference in such systems.

BACKGROUND OF THE INVENTION

Magnetic recording systems have been used as secondary storage in computer systems for many years. They have moderately fast access times and the capability to store massive amounts of data. As a result of advances in computer technology, there is a continuous demand for increases in the capacity of these systems (typically measured in terms of the total number of bits which can be stored), as well as for decreases in access time and cost. This demand has been met in the past, and will most likely continue to be met in the future, by increasing the density of data recording—that is, by increasing the number of bits which may be stored on a given amount of physical disk area. High recording densities allow large amounts of information to be stored in small volumes, which is particularly important, for example, in the case of portable computers. Moreover, higher densities enable both access times and cost to be reduced as well. It is therefore not surprising that recording density has been increasing rapidly in the last several decades. In fact, density has been approximately doubling every three years. At the present time, the maximum density which is commercially available in magnetic recording media (i.e., disk drives) is approaching 1 gigabit per square inch.

Increases in recording density are being achieved as a result of a combination of factors, such as improvements in magnetic materials, advances in read/write head designs, advances in servo technology that allow the magnetic head to be positioned with higher accuracy on the selected track (therefore reducing the necessary spacing between tracks), and finally, advances in the signal processing techniques used to decode the data from the signal generated by the read head. The need for more advanced signal processing techniques arises when density is increased because the electric pulses induced on the read head by adjacent bits tend to interfere and partially cancel each other, resulting in a decrease of the intensity of the detected signal. At the same time, the noise increases as a result of various effects, such as the interference from nearby (i.e., adjacent) tracks. These factors, among others, result in a rapid decrease of the signal to noise ratio (SNR) as recording density is increased. In some cases, advances in signal processing techniques can be used to compensate for this loss of SNR. For a description of certain signal processing techniques used in magnetic recording systems, see, for example, J. M. Cioffi, W. L. Abbott, H. K. Thapar, C. M. Melas, and K. D. Fisher, "Adaptive Equalization in Magnetic-Disk Storage Channels," IEEE Communications Magazine, February 1990, pp. 14–29, and P. H. Siegel and J. K. Wolf, "Modulation and Coding for Information Storage," IEEE Communications Magazine, December 1991, pp. 68–86. For a general discussion of magnetic recording systems, see, for example, R. W. Wood, "Magnetic Recording Systems," Proceedings of the IEEE, Vol. 74, No. 11, November 1986, pp. 1557–1569.

One of the signal processing techniques that has resulted in significant increases in density is the technique known as "Partial Response Maximum Likelihood" (PRML), described, for example, in H. Kobayashi and D. T. Tang, "Application of partial-response channel coding to magnetic recording systems," IBM Journal of Research and Development, Vol. 14, pp. 368–375, July 1970. In this technique, the discrete-time channel response is shaped by means of an adaptive filter referred to as the "equalizer" in such a way that its transfer function, expressed as a z-transform, is:

$$H(z)=1-z^{-2} \quad (1)$$

This response is usually known as "Partial Response Class IV" (PR IV), and it is described, for example, in P. Kabal and S. Pasupathy, "Partial-response signaling," IEEE Transactions on Communications, Vol. COM-23, No. 9, pp. 921–934, September 1975. (Specifically, PRML is the result of combining PR IV with a technique known as "Maximum Likelihood Detection," described, for example, in G. D. Forney, "Maximum-Likelihood Sequence Estimation of Digital Sequences in the Presence of Intersymbol Interference," IEEE Transactions on Information Theory, Vol. IT-18, No. 3, May 1972, pp. 363–378.)

As pointed out above, increases in recording density rapidly degrade the SNR of the signal picked up by the read head. This makes it increasingly important to compensate for certain systematic sources of degradation of the SNR. One such source of degradation is known as intersymbol interference (ISI). This interference is the result of the detected pulses having a non-ideal shape which causes different pulses to interfere with each other. Specifically, ISI occurs because the detected pulses are not properly confined to the "time slot" (i.e., baud period) which is available to the reading of a single data symbol. (For example, a rectangular pulse confined to a given baud period will cause no ISI. However, it is not strictly necessary that the pulse be completely confined to its own time slot—Nyquist pulses, for example, if sampled at the correct instant, will also not cause ISI. Both confined rectangular pulses and Nyquist pulses are considered for purposes herein to be "properly confined" to the available time slot.)

When the detected pulses are not properly confined to the allocated time slot, neighboring pulses induced on the magnetic head by adjacent magnetic transitions on the disk surface will interfere with each other and will degrade the margin against random noise available to the detector. Of course, the width of the allocated time slot depends on the recording density. Therefore, increasing the density will reduce the size of the time slot associated with each pulse and will thereby generally increase ISI.

Intersymbol interference in a PRML receiver is partially compensated for by means of the adaptive filter referred to as the equalizer (see above). Specifically, this filter improves the shape of the detected pulses. More elaborate and complex equalizers do a better job of controlling ISI, and therefore result in improved SNR, which can, in turn, be translated to higher recording densities. Equalizers are usually implemented as adaptive transversal filters. In general, better equalization is achieved by increasing the number of taps of these filters. However, in practical implementations of magnetic recording systems, the number of taps is limited by cost and power dissipation.

The hardware used to process the output of a magnetic disk read head, commonly referred to as the "receiver," is typically implemented in a single VLSI chip in CMOS technology. This chip is commonly referred to as a "read-channel device." The data rates supported by present read-channel devices are in the 100 MHz (Megahertz) range and beyond. Since the power dissipation of CMOS VLSI chips is proportional to their speed of operation, high data rates imply high power dissipation, which is undesirable for numerous reasons including constraints in packaging technology. This, therefore, severely limits the complexity (e.g., number of taps) of the equalizer. As a result, it is impractical to completely compensate for ISI—in most implementations it is necessary to make compromises between performance and cost factors (including power dissipation which, indirectly, can be considered a cost factor).

One particular type of ISI that is common in magnetic recording channels is "precursor ISI." This specific type of interference is caused, for example, by a "leading undershoot" of a detected (positive) pulse. This undershoot commonly appears in the response of inductive read heads as a result of stray magnetic fields at the edges of the heads. ("Trailing undershoot" of a detected pulse also causes undesirable ISI known as "postcursor ISI." However, postcursor ISI can be compensated for using a conventional technique known as "decision-feedback equalization," familiar to those skilled in the art.) Although one way to compensate for precursor ISI would be to provide a sufficiently long transversal filter equalizer, this is usually impractical for the reasons discussed above. Without compensating for precursor ISI, the SNR may be degraded by about 2 dB (decibels) or more. Such a degradation translates into an undesirable loss of recording density of between approximately ten and fifteen percent, given the present state of the art.

SUMMARY OF THE INVENTION

It is an objective of the present invention to provide a cost effective means to compensate for precursor ISI in magnetic recording channels, thereby allowing for the use of increased recording density in magnetic disk drives. Specifically, a method and apparatus for the processing of magnetic recording data signals which realizes cancellation of the effects of precursor intersymbol interference in the data signals is provided in accordance with the present invention. According to one illustrative embodiment, an adaptive filter is used to produce a replica of the precursor ISI, which is then subtracted from a delayed version of the data signal. The amount of the delay is advantageously equal to the delay between the main peak of the channel impulse response and the leading undershoot (i.e., the precursor ISI effect) which is to be canceled. The signal which is provided to the adaptive filter may be based on tentative decisions generated by a symbol-by-symbol detector, and may first be converted from three levels to two levels by a three-to-two level converter. The resultant signal (after the aforementioned subtraction), which is essentially precursor ISI-free, may then be processed by a conventional Viterbi decoder to produce the decoded symbol data.

DETAILED DESCRIPTION

A prior art PRML receiver

Figure 1:
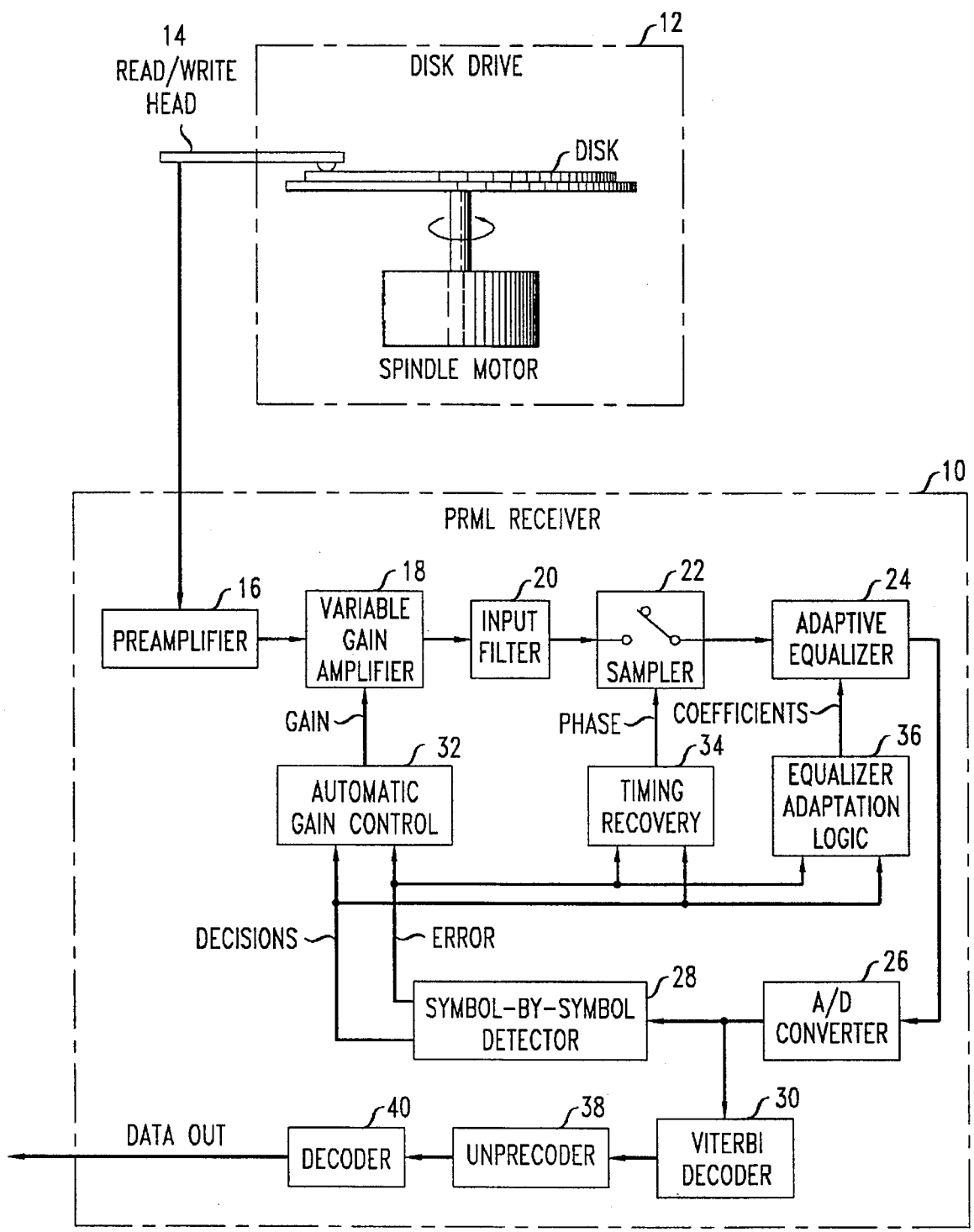
FIG. 1 shows a block diagram of a prior art PRML receiver.

FIG. 1 shows a block diagram of a prior art PRML receiver (receiver 10) connected to magnetic read/write head 14 of disk drive 12. The signal detected by magnetic head 14 is first amplified within receiver 10 by preamplifier 16. Preamplifier 16 may, for example, have a set of user programmable gains to adjust to different read/write heads. Next, the output signal from preamplifier 16 is further amplified by variable gain amplifier 18, whose gain is controlled automatically as will be described below. The purpose of variable gain amplifier 18 is to adjust for the rapid variations of the amplitude of the input signal which tend to occur as a result of, for example, the irregularities of the disk surface and consequent variations of the gap between the head and the disk, since it is desirable to keep the signal level at the input of symbol-by-symbol detector 28 and Viterbi decoder 30 (see below) relatively constant.

After amplification, the signal is filtered by input filter 20, which removes high frequency noise and serves as an anti-aliasing filter for the sampling operation that follows. Input filter 20 operates in continuous time. Sampler 22 produces discrete-time samples of the signal for use by subsequent portions receiver 10. The phase of sampler 22 is controlled by timing recovery 34 as described below. Note that from this point "forward," receiver 10 operates in discrete time. Adaptive equalizer 24 is an adaptive transversal filter which compensates for a portion (but not all) of the ISI as described above. Equalizer 24 also shapes the channel response to a PR IV response characterized by the transfer function of equation (1) above.

The output of equalizer 24 is converted to a digital representation by A/D converter 26, and then passed to symbol-by-symbol detector 28. Symbol-by-symbol detector 28 compares the equalizer output with two thresholds and makes a ternary (i.e., three-way) decision, resulting in one of three symbols (which, for illustrative purposes herein, will be labelled "+1," "0" and "−1," respectively). The decoded data which is actually provided as output from the receiver are not the symbols produced by symbol-by-symbol detector 28, but rather, are based on symbol decisions made by Viterbi decoder 30, which are much more reliable. See, for example, G. D. Forney, "The Viterbi Algorithm," Proceedings of the IEEE, Vol. 61, No. 3, pp. 268–278, March 1973, for a description of the operation of a Viterbi decoder.

In essence, the additional reliability of Viterbi decoder 30 is achieved by delaying decisions until enough information is available to make these decisions more reliably. As such, a Viterbi decoder introduces significant delay. Symbol-by-symbol detector 28, on the other hand, provides quick (i.e., earlier) decision data to automatic gain control 32, timing recovery 34 and equalizer adaptation logic 36. Since each of these blocks operate inside feedback loops, it is important to minimize the loop delay to prevent instabilities. Using decisions provided by the Viterbi decoder would introduce too much delay in these loops, and would thereby likely render them unstable. Although the decisions provided by the symbol-by-symbol detector are less reliable than those provided by the Viterbi decoder, this unreliability has a negligible effect on these loops. The loops tend to average the effect of many decisions, and are therefore not significantly affected by occasional decision errors which may be made by the symbol-by-symbol detector.

In addition to the symbol data, symbol-by-symbol detector 28 computes an error, which represents the difference between the input level and its ideal value, and passes this information to automatic gain control 32, timing recovery 34 and equalizer adaptation logic 36. Automatic gain control 32 adjusts the gain of the variable gain amplifier 18 in order to keep the three levels at the output of adaptive equalizer 24 as close as possible to constant levels. As described above, this is important because of the rapid variations in the signal level provided by the read head as the gap between the head and the disk varies. Timing recovery 34 adjusts the sampling phase of the sampler at the input of the equalizer such that the signal is sampled at the appropriate (i.e., optimum) instant in time. And equalizer adaptation logic 36 computes the values of the coefficients for adaptive equalizer 24, thereby shaping the detected pulse in a manner which attempts to minimize ISI. These three blocks use decision directed algorithms, and therefore require as inputs both the decisions and the error as provided by symbol-by-symbol detector 28. These conventional algorithms are well known to those skilled in the art, and are described, for example, in R. Cideciyan, F. Dolivo, R. Hermann, W. Hirt, and W. Schott, "A PRML System for Digital Magnetic Recording," IEEE Journal on Selected Areas in Communications, Vol. 10, No. 1, January 1992, pp. 38–56.

In magnetic recording channels the data to be stored on the disk is typically encoded and precoded before it is written on the disk. Encoding has various purposes, including, for example, error protection, limiting the length of error events, and producing enough transitions for accurate timing recovery. Precoding is a conventional operation in partial response systems such as PRML, and is used to reduce error propagation. The precoding and encoding operations are reversed in unprecoder 38 and decoder 40, respectively, of FIG. 1. In particular, the output of Viterbi decoder 30 (i.e., the resultant stream of symbols generated thereby) is first "unprecoded" by unprecoder 38, and then decoded by decoder 40. It is the output of decoder 40 which is supplied by the PRML receiver (e.g., read-channel device) of FIG. 1 as its final output. This output signal may then have yet additional error correction performed thereupon before the data is actually transferred to its ultimate destination, the computer system.

Figure 2:
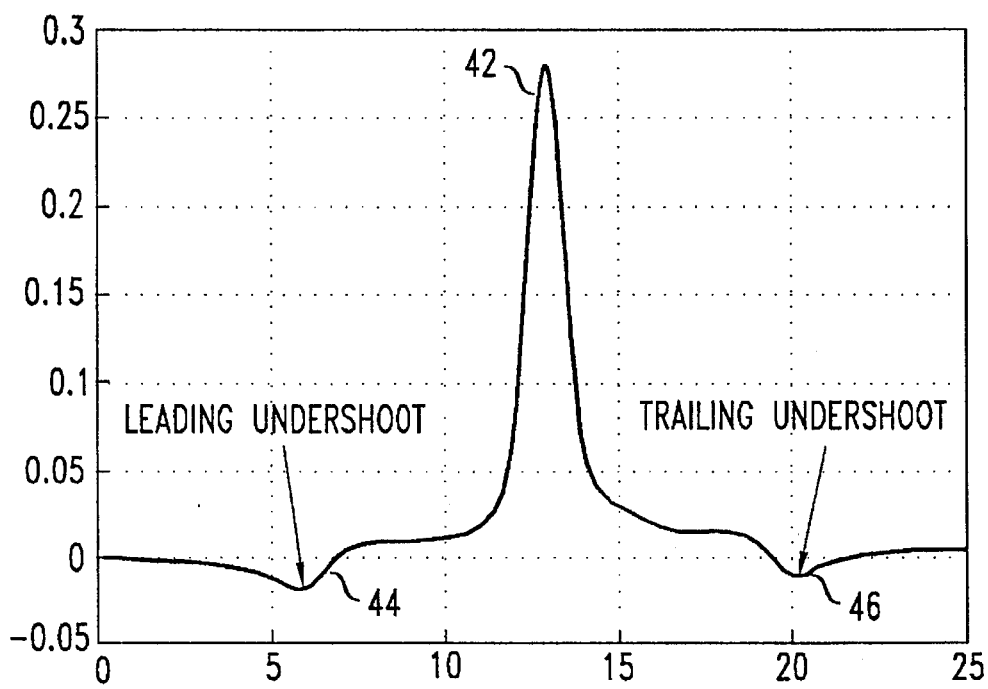
FIG. 2 shows a typical detected pulse having characteristics likely to produce ISI as detected by the PRML receiver of FIG. 1.

FIG. 2 shows a typical detected pulse having characteristics likely to produce ISI as detected by the PRML receiver of FIG. 1. As described above, ISI occurs because the detected pulses are not properly confined to the "time slot" which is available to the reading of a single data symbol. When the detected pulses are not confined to this time slot, neighboring pulses induced on the magnetic head by adjacent magnetic transitions on the disk surface will interfere with each other and will degrade the margin against random noise available to the detector.

As can be seen in the illustration of FIG. 2, the detected signal comprises main spike 42, as well as leading undershoot 44 and trailing undershoot 46. In particular, leading undershoot 44, which causes precursor ISI, appears in the response of the inductive read heads as a result of stray magnetic fields at the edges of the heads. Although precursor ISI is a source of significant performance degradation in magnetic recording channels, compensating for this particular form of ISI using an improved equalizer 24 is typically not cost effective. The objective of the present invention is to provide a cost effective method and apparatus to compensate for precursor ISI in magnetic recording channels such as that caused by leading undershoot 44 in FIG. 2. (As mentioned above, trailing undershoot 46, which produces postcursor ISI, can be compensated for using a conventional decision-feedback equalization technique.)

An illustrative PRML receiver in accordance with the present invention

Figure 3:
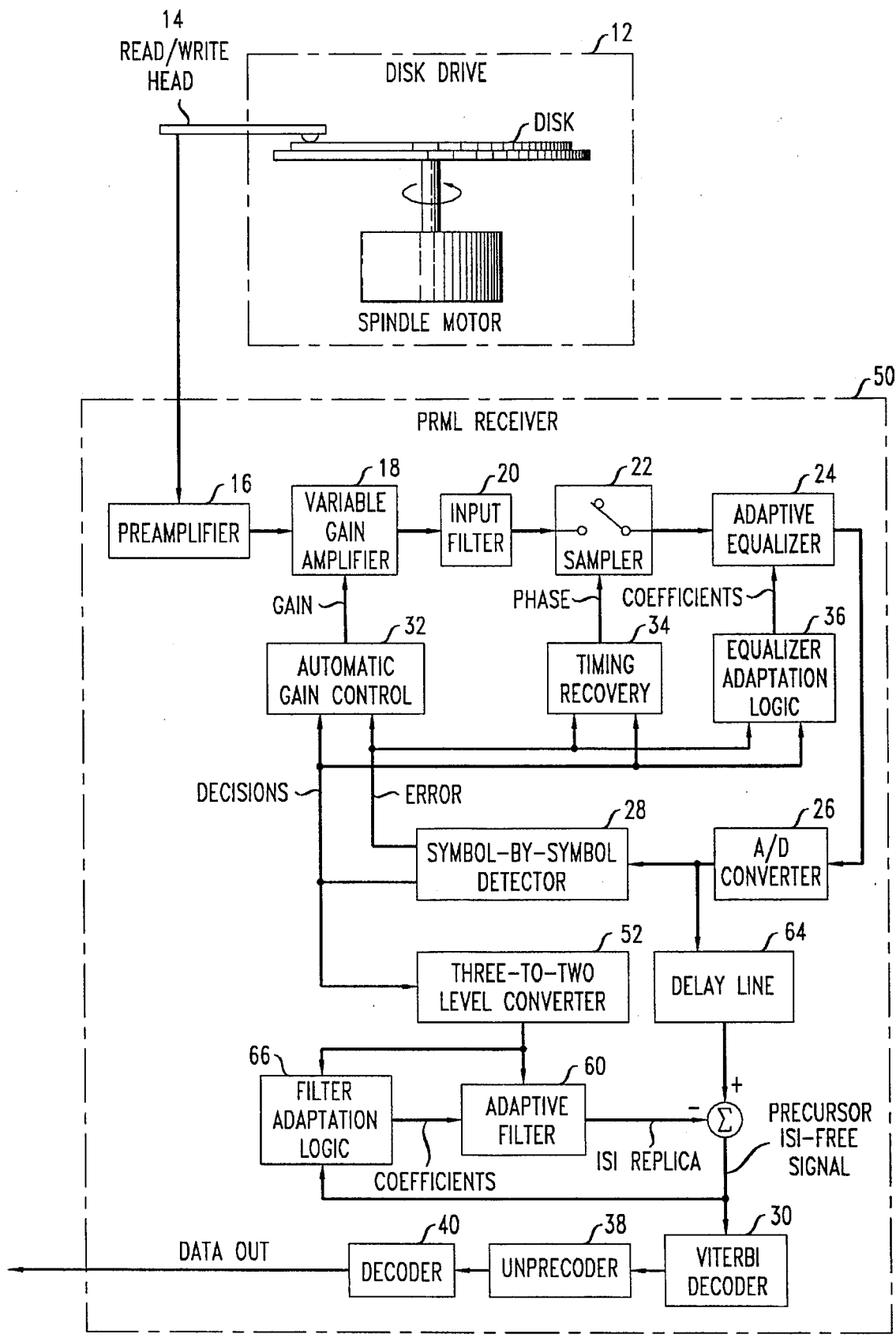
FIG. 3 shows a block diagram of a PRML receiver providing for cancellation of precursor ISI in accordance with an illustrative embodiment of the present invention.

FIG. 3 shows a block diagram of an illustrative PRML receiver (receiver 50) providing for cancellation of precursor ISI in accordance with one embodiment of the present invention. Receiver 50 comprises all of the components comprised in prior art receiver 10, in addition to components which have been added to realize cancellation of precursor ISI.

Figure 4:
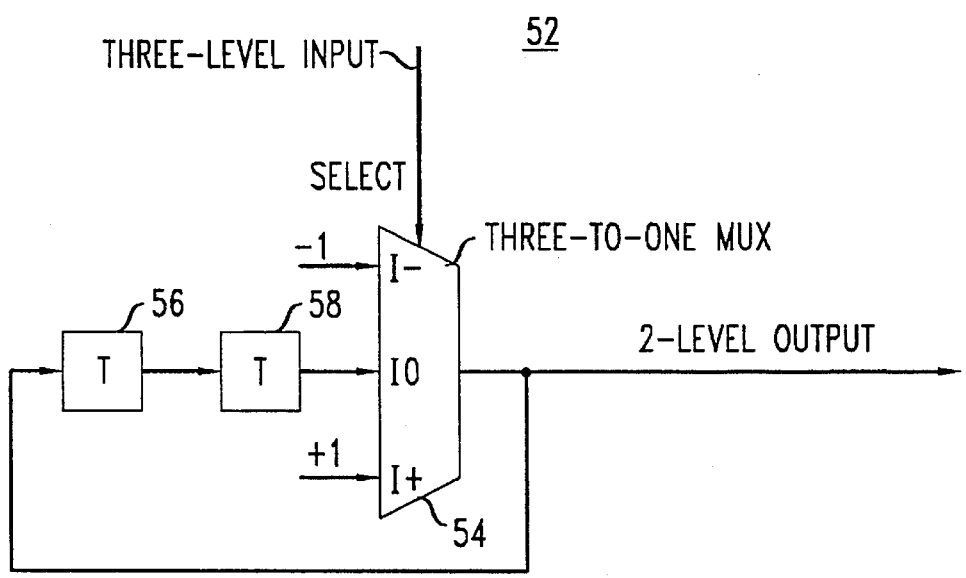
FIG. 4 shows a three-to-two level converter for use in the illustrative PRML receiver of FIG. 3.

Specifically, in PRML receiver 50, the tentative decisions provided by symbol-by-symbol detector 28 are converted from three to two levels by three-to-two-level converter 52 (in addition to being provided to automatic gain control 32, timing recovery 34 and equalizer adaptation logic 36, as they are in receiver 10). FIG. 4 shows an expanded diagram of three-to-two-level converter 52, having three-to-one multiplexer 54 and (single baud period) time delays 56 and 58. In operation, the three-level input provided by symbol-by-symbol detector 28 controls three-to-one multiplexer 54. (For illustrative purposes herein, the three levels provided by symbol-by-symbol detector 28 are labelled "+1," "0" and "−1.") If the control input is "+1," multiplexer 54 selects input "I+," which is hardwired to a binary value of "+1." Similarly, if the control input is "−1," the multiplexer selects input "I−," which is hardwired to binary value "−1." However, if the control input is "0," multiplexer 54 selects input "I0," which provides as output the value which the multiplexer produced two baud periods earlier.

Returning to FIG. 3, the output of three-to-two-level converter 52 is passed to adaptive filter 60. Adaptive filter 60 is an adaptive FIR (finite-impulse-response) filter having a sufficient number of taps to adequately model the precursor part of the impulse response shown in FIG. 2. A small number of taps, such as 3, is usually adequate. Thus, the output of filter 60 comprises a replica of the precursor ISI. This ISI replica is then subtracted by subtractor 62 from a delayed version of the signal produced by A/D converter 26. Specifically, delay line 64 delays this signal by a number of periods equal to the delay between the main peak of the channel impulse response and the leading undershoot. Since this delay varies with the disk spinning speed, the head dimensions, and whether the track being read is an inner or an outer track in the disk, the delay must be user-programmable. For example, a delay which is programmable between 15 and 25 baud periods may be used.

As a result of the above-described components, the output of subtractor 62 comprises an essentially precursor ISI-free signal, albeit a signal which is delayed from the corresponding (non-precursor ISI-free) signal produced by A/D converter 26. This signal is then passed to Viterbi decoder 30 and processed by unprecoder 38 and decoder 40 in a similar manner as in prior art receiver 10 of FIG. 1. In the case of receiver 50, however, the output of Viterbi decoder 30 is of improved accuracy as a result of the compensation for precursor ISI provided by the above-described components. Typically, with use of the illustrative embodiment of the present invention as shown and described herein, the error rate at the output of the Viterbi decoder can be reduced by a factor 10 as compared to the prior art receiver shown in FIG. 1.

In addition to being passed to Viterbi decoder 30, the output of subtractor 62 is provided to filter adaptation logic 66, as is the output of three-to-two level converter 52. Filter adaptation logic 66 provides as its output the coefficients for use by adaptive filter 60. Specifically, a conventional LMS (least-mean-squares) algorithm is used to adapt the coefficients. The LMS algorithm, as well as the overall operation of the adaptive filtering technique applied herein, will be familiar to those of ordinary skill in the art.

For clarity of explanation, the illustrative embodiment of the present invention is presented as comprising individual functional blocks. The functions these blocks represent may be provided through the use of either shared or dedicated hardware, including, but not limited to, hardware capable of executing software. For example, the functions of the blocks presented in FIGS. 3 and 4 may be provided by a single shared processor. (Use of the term "processor" should not be construed to refer exclusively to hardware capable of executing software.)

Although a specific embodiment of this invention has been shown and described herein, it is to be understood that this embodiment is merely illustrative of the many possible specific arrangements which can be devised in application of the principles of the invention. Numerous and varied other arrangements can be devised in accordance with these principles by those of ordinary skill in the art without departing from the spirit and scope of the invention.

We claim:

1. A method of decoding an input signal representing information recorded on a magnetic recording medium to produce an output signal comprising a sequence of decoded symbols representing the recorded information, the method comprising the steps of:

generating a first signal based on the input signal;

generating a second signal based on the first signal, wherein the second signal comprises a sequence of tentatively identified decoded symbols;

applying a delay to the first signal to generate a third signal;

filtering the second signal to produce a fourth signal;

subtracting the fourth signal from the third signal to produce a fifth signal; and producing the output signal based on the fifth signal.

2. The method of claim 1 wherein the step of generating the first signal comprises applying a first adaptive filter to said input signal, wherein filter coefficients of said first adaptive filter are generated based on the second signal.

3. The method of claim 1 wherein the step of generating the second signal comprises applying a symbol-by-symbol detector to said first signal.

4. The method of claim 3 wherein the step of generating the second signal further comprises converting an output of the symbol-by-symbol detector from three levels to two levels.

5. The method of claim 1 wherein the step of filtering the second signal comprises applying a second adaptive filter, wherein filter coefficients of said second adaptive filter are generated based on the fifth signal.

6. The method of claim 1 wherein the step of producing the output signal based on the fifth signal comprises applying a Viterbi decoder to the fifth signal.

7. The method of claim 1 wherein the first signal includes signal information representative of a pulse having leading undershoot, the fourth signal comprises signal information representative of a replica of said leading undershoot, and the fifth signal includes signal information representative of a pulse substantially equivalent to the pulse represented by the signal information included in the first signal, but substantially free of said leading undershoot.

8. A receiver apparatus for decoding an input signal representing information recorded on a magnetic recording medium and for producing an output signal comprising a sequence of decoded symbols representing the recorded information, the receiver apparatus comprising:

means for generating a first signal based on the input signal;

means for generating a second signal based on the first signal, wherein the second signal comprises a sequence of tentatively identified decoded symbols;

a delay applied to the first signal to generate a third signal;

a filter applied to the second signal to produce a fourth signal;

means for subtracting the fourth signal from the third signal to produce a fifth signal; and means for producing the output signal based on the fifth signal.

9. The receiver apparatus of claim 8 wherein the means for generating the first signal comprises a first adaptive filter applied to said input signal, wherein filter coefficients of said first adaptive filter are generated based on the second signal.

10. The receiver apparatus of claim 8 wherein the means for generating the second signal comprises a symbol-by-symbol detector applied to said first signal.

11. The receiver apparatus of claim 10 wherein the means for generating the second signal further comprises a three-to-two level converter for converting an output of the symbol-by-symbol detector from three levels to two levels.

12. The receiver apparatus of claim 8 wherein the filter applied to the second signal comprises a second adaptive filter, wherein filter coefficients of said second adaptive filter are generated based on the fifth signal.

13. The receiver apparatus of claim 8 wherein the means for producing the output signal based on the fifth signal comprises a Viterbi decoder applied to the fifth signal.

14. The receiver apparatus of claim 8 wherein the first signal includes signal information representative of a pulse having leading undershoot, the fourth signal comprises signal information representative of a replica of said leading undershoot, and the fifth signal includes signal information representative of a pulse substantially equivalent to the pulse represented by the signal information included in the first signal, but essentially free of said leading undershoot.

* * * * *